US009876773B1

United States Patent
Brandwine et al.

(10) Patent No.: US 9,876,773 B1
(45) Date of Patent: *Jan. 23, 2018

(54) PACKET AUTHENTICATION AND ENCRYPTION IN VIRTUAL NETWORKS

(71) Applicant: Amazon Technologies, Inc., Seattle, WA (US)

(72) Inventors: Eric Jason Brandwine, Haymarket, VA (US); Ian R. Searle, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 34 days.

This patent is subject to a terminal disclaimer.

(21) Appl. No.: 14/949,225

(22) Filed: Nov. 23, 2015

Related U.S. Application Data

(63) Continuation of application No. 14/060,396, filed on Oct. 22, 2013, now Pat. No. 9,197,610, which is a continuation of application No. 12/654,706, filed on Dec. 29, 2009, now Pat. No. 8,584,228.

(51) Int. Cl.
*H04L 29/06* (2006.01)

(52) U.S. Cl.
CPC .......... *H04L 63/06* (2013.01); *H04L 63/0428* (2013.01); *H04L 63/123* (2013.01)

(58) Field of Classification Search
None
See application file for complete search history.

(56) References Cited

U.S. PATENT DOCUMENTS

| | | |
|---|---|---|
| 2003/0068047 A1 | 4/2003 | Lee et al. |
| 2003/0133574 A1 | 7/2003 | Caronni et al. |
| 2003/0217289 A1* | 11/2003 | Ammon ............ H04L 63/1416 726/23 |
| 2004/0032829 A1 | 2/2004 | Bonn |
| 2004/0259529 A1 | 12/2004 | Suzuki |
| 2005/0132030 A1 | 6/2005 | Hopen et al. |
| 2005/0226423 A1 | 10/2005 | Li et al. |
| 2007/0180493 A1 | 8/2007 | Croft et al. |
| 2009/0089537 A1 | 4/2009 | Vick et al. |
| 2009/0172824 A1 | 7/2009 | Colburn |

(Continued)

OTHER PUBLICATIONS

S. Kent and K. Seo, "RFC 4301: Security Architecture for the Internet Protocol." Dec. 2005, available from http://tools.ietf.org/html/rfc4301 on Dec. 29, 2009.

(Continued)

*Primary Examiner* — David Le
(74) *Attorney, Agent, or Firm* — Seed IP Law Group LLP

(57) ABSTRACT

Systems and methods provide logic for distributing cryptographic keys in a physical network comprising a plurality of physical nodes. In one implementation, a computer-implemented method is provided for distributing cryptographic keys in a physical network. The method includes receiving information mapping a virtual network address of a virtual node to a physical network address of a physical node. The virtual node may be associated with a virtual network hosted by the physical node, and the received mapping information identifies a virtual network address of the node and the physical network address of the node. The mapping service transmits a current version of a cryptographic key and an identifier of the current version to the physical node.

20 Claims, 6 Drawing Sheets

(56) References Cited

U.S. PATENT DOCUMENTS

2009/0248846 A1    10/2009  Cohn
2015/0365281 A1*   12/2015  Marino ................ G06Q 30/04
                                                        709/223

OTHER PUBLICATIONS

S. Kent, "RFC 4302: IP Authentication Header," Dec. 2005, available from http://tools.ietf.org/html/rfc4302 on Dec. 29, 2009.
S. Kent, "RFC 4303: IP Encapsulating Security Payload (ESP)." Dec. 2005, available from http://tools.ietf.org/html/rfc4303 on Dec. 29, 2009.
S. Kent, "RFC 4304: Extended Sequence Number (ESN) Addendum to IPsec Domain of Interpretation (DOI) for Internet Security Association and Key Management Protocol (ISAKMP)," Dec. 2005, available from http://tools.ietf.org/html/rfc4304 on Dec. 29, 2009.
D. Eastlake, "RFC 4305: Cryptographic Algorithm Implementation Requirements for Encapsulating Security Payload (ESP) and Authentication Header (AH)." Dec. 2005, available from http://tools.ietf.org/html/rfc4305 on Dec. 29, 2009.
C. Kaufman, "RFC 4306: Internet Key Exchange (IKEv2) Protocol," Dec. 2005, available from http://tools.ietf.org/html/rfc4306 on Dec. 29, 2009.
J. Schiller, "RFC 4307: Cryptographic AlgOrithms for Use in the Internet Key Exchange Version 2 (IKEv2)." Dec. 2005, available from http://tools.ietf.org/html/rfc4307 on Dec. 29, 2009.
P. Hoffman, "RFC 4308: Cryptographic Suites for IPsec," Dec. 2005, available from http://tools.ietf.org/html/rfc4308 on Dec. 29, 2009.
R. Housley, "RFC 4309: Using Advanced Encryption Standard (AES) CCM Mode with IPsec Encapsulating Security Payload (ESP)," Dec. 2005, available from http://tools.ietf.org/html/rfc4309 on Dec. 29, 2009.

* cited by examiner

PACKET AUTHENTICATION AND ENCRYPTION IN VIRTUAL NETWORKS

CROSS-REFERENCE TO RELATED APPLICATIONS

This application is a continuation of co-pending U.S. application Ser. No. 14/060,396, filed on Oct. 22, 2013, which is a continuation of U.S. application Ser. No. 12/654,706, filed on Dec. 29, 2009, now U.S. Pat. No. 8,584,228, and titled "Packet Authentication and Encryption in Virtual Networks," all of which are hereby incorporated in their entirety.

BACKGROUND

Corporations and other large organizations often interconnect various computer systems into networks in support of their operations. For example, such computer networks may be composed of one or more private networks linked to multiple, geographically-dispersed computer systems that themselves may be linked via interconnecting networks. Modern virtualization technologies, such as VMWare and XEN, simply the operation, maintenance, and configuration of such virtual networks. However, such networks are still vulnerable to "spoofing" attacks that inject packets into authorized network traffic, as well as "man-in-the-middle" attacks that intercept and modify data packets during transmission across the virtual network. In addition, information transmitted via such networks may be "sniffed" by unauthorized parties.

Modern communications protocols, such as the IPSec protocol for securing packetized communications, support the authentication and integrity checking of transmitted data packets. In such protocols, a "security association" is established between two communicating entities based on a negotiation and mutual exchange of cryptographic information. For example, in IPSec, the Internet Key Exchange (IKE) protocol establishes the security association through the negotiation and mutual authentication of a shared secret, from which shared cryptographic keys are derived. Once the security association is established, a sending entity will be able to hash, encrypt, and sign transmitted data packages, and the receiving entity will be able to receive and verify that signature.

However, the negotiation processes common to the IKE protocol are often impractical to implement in virtual networks. For example, such protocols require the exchange and subsequent verification of data using multiple messages before the shared secret is defined. These messages, when exchanged in a virtual network environment, may be subject to various attacks that could compromise the key exchange process in the virtual network environment. Therefore, systems and methods are needed to overcome the limitations of traditional key exchange and key generation processes within virtual networks.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
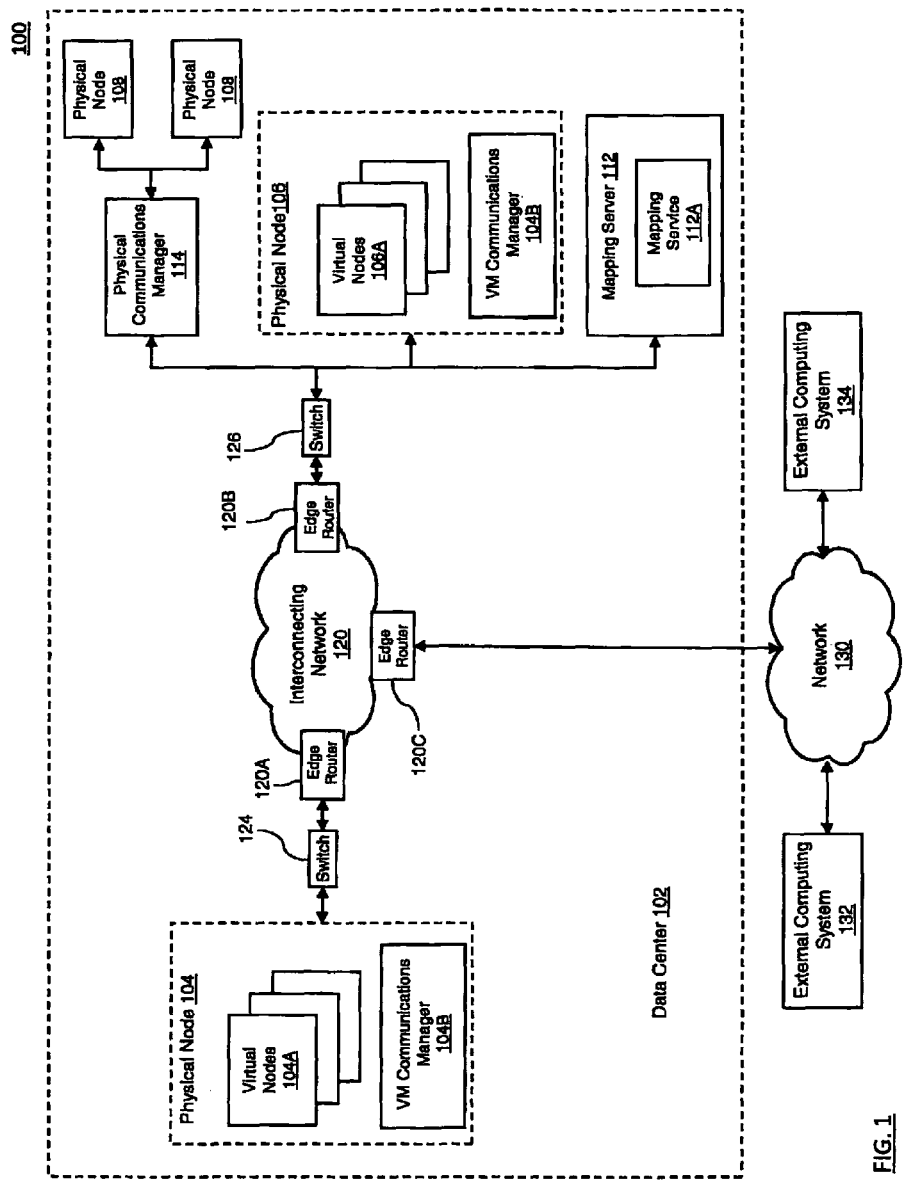
FIG. 1 is a diagram of an exemplary architecture of a system for distributing cryptographic keys in a virtual network.

The following detailed description refers to the accompanying drawings. Wherever possible, the same reference numbers are used in the drawings and the following description to refer to the same or similar parts. While several exemplary embodiments are described herein, modifications, adaptations and other implementations are possible. For example, substitutions, additions or modifications may be made to the components illustrated in the drawings, and the exemplary methods described herein may be modified by substituting, reordering, removing, or adding steps to the disclosed methods. Accordingly, the following detailed description is not limiting of the disclosed embodiments. Instead, the proper scope is defined by the appended claims.

Disclosed embodiments provide computer-implemented systems and methods for distributing cryptographic keys in a physical network comprising a plurality of nodes. For example, cryptographic keys may be securely distributed to virtual nodes of a particular virtual network overlaid on one or more physical networks.

According to disclosed embodiments, a mapping service associated with a physical network may receive information to map a virtual network address of a virtual node to a physical network address of a physical node. For example, the physical node may be a physical computing system, or the physical node may be a physical computing system that hosts a virtual network including the virtual node. Further, for example, the received mapping information may include one or more of a virtual network address of the virtual node and a physical network address of the physical node. The mapping service may then transmit a current version of a cryptographic key and an identifier of the current version from the mapping service to the physical node.

In an embodiment, the node authenticates a packet transmitted across the physical network using the current version of the cryptographic key and the identifier of the current version of the cryptographic key. For example, the node may generates the packet, compute a hash value of a header of the generated packet using the current version of the cryptographic key, and transmit the generated packet, the computed hash, and the identifier of the current version of the cryptographic key across the virtual network to a destination node. Further, for example, the destination node may receive the packet, a corresponding hash value, and the identifier of a current version of the cryptographic key. The destination node may then select a local cryptographic key based on the received identifier, and compute a local hash value of the received packet using the local version of cryptographic key. The destination node may compare the computed local hash value with the received hash value, and authenticate the received packet when the local hash value matches the received hash value.

Consistent with a disclosed embodiment, a computer-implemented method is provided for distributing cryptographic keys in a physical network comprising a plurality of physical nodes. The method includes receiving, at a mapping service, information mapping a virtual network address of a virtual node to a physical network address of a physical node. The virtual node is associated with a virtual network hosted by the physical node, and the received information identifies the virtual network address of the virtual node and the physical network address of the physical node. The mapping service transmits a current version of a cryptographic key from the mapping service to the physical node. The virtual node generates a packet for transmission to a destination node, and the physical node computes a hash value of a header of the generated packet using the current version of the cryptographic key. The physical node then transmits generated packet, the computed hash, and an identifier of the current version of the cryptographic key across the physical network to the destination node. The destination node receives the packet, the computed hash value, and the identifier from the physical node. and the destination node selects a local version of the cryptographic key based on the received identifier. The destination node computes a local hash value of the received packet using the local version of the cryptographic key, and compares the computed local hash value with the received hash value. The destination node authenticates the received packet when the local hash value matches the received hash value. The mapping service stores information associated with the plurality of physical nodes of the physical network, and the stored information includes information identifying one or more virtual networks hosted by the physical nodes, and information identifying one or more virtual nodes of the one or more virtual networks.

Consistent with another disclosed embodiment, a computer-implemented method is provided for distributing cryptographic keys in a physical network comprising a plurality of physical nodes. The method includes receiving information mapping a virtual network address of a virtual node to a physical network address of a physical node. The virtual node is associated with a virtual network hosted by the physical node, and the received mapping information identifies the virtual network address of the virtual node and the physical network address of the physical node. The mapping server then transmits a current version of a cryptographic key to the physical node.

Consistent with a further disclosed embodiment, a system is provided for key distribution within a physical network. The system comprises a node and a mapping server in communication with the node. The mapping server comprises a processor and a storage device. The mapping server is configured to receive information mapping a virtual network address of a virtual node to a physical network address of a physical node. The virtual node is associated with a virtual network hosted by the physical node, and the received mapping information identifies the virtual network address of the virtual node and the physical network address of the physical node. The mapping server is further configured to transmit a current version of a cryptographic key to the physical node.

Consistent with other disclosed embodiments, computer-readable media are provided that store program instructions for distributing a key in a physical network. The program instructions are executed by a processor to perform a process that includes receiving information mapping a virtual network address of a virtual node to a physical network address of a physical node. The virtual node is associated with a virtual network hosted by the physical node, and the received mapping information identifies the virtual network address of the virtual node and the physical network address of the physical node. The process also includes transmitting a current version of a cryptographic key to the physical node.

FIG. 1 is a diagram of an exemplary architecture for a computing system 100 that facilitates the distribution of cryptographic keys within a physical network, consistent with disclosed embodiments. System 100 may provide functionality for registering a plurality of nodes of the physical network with a mapping service, and for securely distributing cryptographic keys to the registered nodes. For example, a node may transmit mapping information to the mapping service associated with the physical network. Upon authentication by the mapping service, the node may receive a current version of a cryptographic key from the mapping service, and may authenticate messages based on a hash value computed from the received cryptographic key.

In system 100, nodes 104, 106, 108, and 110 (i.e., "physical nodes") are interconnected via an interconnecting network 120 to form a physical network within a data center 102. Further, in system 100, interconnecting network 120 is connected to a network 130 external to the data center 102, which facilitates communications among data center 102 and external computing systems 132 and/or 134.

Interconnecting network 120 and network 130 may represent any form or medium of digital data communication. Examples of network 130 include a local area network ("LAN"), a wireless LAN, e.g., a "WiFi" network, a wireless Metropolitan Area Network (MAN) that connects multiple wireless LANs, and a wide area network ("WAN"), e.g., the Internet, a private network, and an intranet. In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, network 130 may also include one or more mobile device networks, such as a GSM network or a PCS network, that allow mobile devices to send and receive data across network 130 via applicable communications protocols, including those described above. Further, in disclosed embodiments, interconnecting network 120 may include a physical network having one or more edge routers and corresponding internal core routers, as described below.

In system 100, nodes 104 and 106 may include computing systems that host multiple virtual nodes and that include a virtual machine ("VM") communication manager module (e.g., as part of a virtual machine hypervisor monitor for the computing system). For example, node 104 hosts virtual nodes 104A and includes a VM communication manager module 104B. Similarly, node 106 hosts virtual nodes 106A and includes a VM communication manager 106B. Further, the virtual nodes hosted by the computing systems may be incorporated within one or more virtual networks hosted by nodes 104 and 106.

Nodes 108 and 110 of system 100 may include computing systems housed within data center 102. For example, one or more of nodes 108 and 110 may directly execute software on behalf of a user of services provided by data center 102. Nodes 108. and 110 are communicatively linked to a physical communication manager 114 that manages communications of nodes 108 and 110 across interconnecting network 120. In an embodiment, physical communication manager 114 may represent a module executed by one or more processors of an additional computing system (not shown), and additionally or alternatively, on one or more of the nodes 108 and 110.

Nodes 104, 106, 108, and 110, may each comprise a general-purpose computer (e.g., a personal computer, network computer, server, or mainframe computer) having one or more processors that may be selectively activated or reconfigured by a computer program. Further, one or more of nodes 104, 106, 108, and 110, may access additional computing systems and servers and may be implemented in a distributed network. Additional details regarding nodes 108 and 110 are described below in reference to FIG. 3, and additional details regarding nodes 104 and 106 are discussed below in reference to FIG. 4.

System 100 also may include a mapping server 112 in communication with nodes 104, 106, 108, and 110, across interconnecting network 120. Mapping server 112 may include a mapping service 112A that, in an embodiment, may represent a module executed by mapping server 112, or alternatively, a general-purpose computer in communication with mapping server 112 using, for example, interconnecting network 120.

In an embodiment, mapping server 112, either individually or in combination with mapping service 112A, stores information associated with the physical network housed within data center 102 that includes, but is not limited to, physical network addresses of nodes 104, 106, 108, and 110, physical network addresses associated with other components of the physical network, virtual network addresses of virtual nodes 104A and 106A, and additional information that describes nodes of the physical network and that identifies prior communications between nodes in the physical network.

In the embodiments described below, mapping service 112A can, in conjunction with communications managers 104B, 106B, and 114, configure and manage communications between a plurality of nodes of the physical network. For example, and as described below, mapping service 112A can authorize communications between nodes based on a verification that the nodes are members of the physical network. Such authorization processes can reduce or eliminate a need for the physical network to employ network hardware, e.g., switches, to block communications involving an unauthorized node. Further, in embodiments described herein, the functionalities of mapping service 112A can be leveraged to securely distribute cryptographic keys to nodes of the physical network without the node-to-node communications necessary in other key exchange protocols.

In system 100, data center 102 may house two computer systems hosting virtual nodes, e.g., nodes 104 and 106 hosting respective virtual nodes 104A and 106A, two additional computer systems, e.g., nodes 108 and 110, and mapping server 112. However, one of skill in the art will appreciate system 100 may include any additional or alternate number of these components. Furthermore, one of ordinary skill in the art will recognize that one or more of the components of system 100 may be combined and/or divided into subcomponents For example, mapping server 112 (and additionally or alternatively, mapping service 112A) may include a single computer system, a single computer system having front- and back-end components, or across any number of distributed computing systems.

Data center 100 also may include multiple network devices, including switches 124 and 126, edge routers 120A-120C, and one or more core routers that facilitate communications across interconnecting network 120. For example, switch 124 is part of a physical network that includes node 104 and is in communication with edge router 120A of interconnecting network 120. Further, for example, switch 126 is part of a physical network that includes nodes 106, 108, and 110, mapping server 112, and physical communications manager 114, and is in communication with edge router 120B of interconnecting network 120. The physical networks established and serviced by switches 124 and 126 may be interconnected via interconnecting network 120, which, in an embodiment, further connects each of the physical networks to an additional network, e.g., network 130.

As described above, interconnecting network 120 includes edge routers 120A-120C that provide gateways from between two or more physical networks and one or more core routers (not shown). For example, edge router 120A may provide a gateway between the physical network established by switch 124 and interconnecting network 120, and edge router 120B may provide a similar gateway between the physical network established by switch 126 and interconnecting network 120. Further, for example, edge router 120C may provide an additional gateway between interconnecting network 120 and network 130.

The core routers of interconnecting network 120 (not shown) may manage and route communications within interconnecting network 120. For example, the core routers of interconnecting network 120 may forward data packets, or other data transmissions, based on characteristics of the transmitted data (e.g., header information including source and/or destination addresses and protocol identifiers), and/or characteristics of interconnecting network 120 (e.g., network topology).

In an embodiment, mapping service 112A may act in conjunction with communication managers 104B, 106B, and 114 to configure, authorize and otherwise manage communications sent to and from the nodes of data center 102, and delivered to virtual nodes hosted by these nodes. For example, VM communication manager 1046 may manage communications associated with virtual nodes 104A hosted by node 104, and similarly, VM communication manager 106B may manage communications associated with virtual nodes 106A hosted by node 106. Further, for example, communications manager 114 may manage communications associated with nodes 108 and 110.

In disclosed embodiments, mapping service 112A and communication managers 1046, 1066, and 114 may collectively act to configure communications between nodes so as to overlay a particular virtual network over one or more physical networks, including, but not limited to, interconnecting network 120, network 130, and one or more private networks or intranets. Further, mapping service 112A and communication managers 104B, 106B, and 114 may also authorize communications between nodes of such overlaid networks to enhance network isolation and security. The configuration and authorization of communications between physical and virtual nodes of a virtual network overlaid onto one or more physical networks is described in greater detail within U.S. patent application Ser. No. 12/060,074, filed on Mar. 31, 2008, entitled "Configuring Communications Between Computing Nodes," which is incorporated herein by reference in its entirety.

In system 100, the overlaid virtual network of data center 102 may include one or more of virtual nodes 104A and 106A respectively hosted by nodes 104 and 106, and additional nodes 108 and 110. In an embodiment, a first network addressing protocol, e.g., Internet Protocol Version 4 (IPv4), may represent virtual network addresses for virtual nodes. For example, a node, e.g., one of virtual nodes 104A, may direct an outgoing communication (not shown) to a destination node, e.g., one of virtual nodes 106A, by specifying a virtual network address for that destination node. However, in additional embodiments, one of nodes 108 and 110 may direct outgoing communications to one or more physical or virtual nodes, and additionally or alternatively, may receive communications from one or more physical or virtual nodes.

Communication manager 104B may receive the outgoing communication and may determine whether the outgoing communication is authorized. For example, communications manager 104B may authorize the communication based on previously-obtained information about the source and/or destination node (e.g., information about virtual networks and/or entities with which the computing nodes are associated). Additionally or alternatively, communications manager 104B may authorize the outgoing communication based on information obtained from a dynamic interaction with mapping service 112A.

Once communications manager 104B authorizes the outgoing communications, communications manager 104B may obtain an actual physical network location corresponding to the destination virtual network address for the communication. For example, and as discussed above, such information may be obtained through the dynamic interaction with mapping service 112A. In an embodiment, interconnection network 120 may utilize a second network addressing protocol, e.g., Internet Protocol Version 6 (IPv6), to represent the physical network addresses for nodes communicating across the interconnection network. Communication manager 104B may then re-header the outgoing communication so that it is directed to the communication manager associated with the destination node, e.g., communications manager 106B, using the obtained actual IPv6 network address of node 106.

Communication manager module 106B may receive the communication via interconnecting network 120 and extract the virtual destination network address from the physical IPv6 destination network address to identify the destination node, e.g., one or more of virtual nodes 106A. In an embodiment, communication manager 106B may subsequently determine whether the communication is authorized for receipt at the destination node, for example, by extracting the virtual source network address, and confirming that the destination node associated with the virtual source network address is managed by communication manager that forwarded the communication, e.g., communications manager 104B. If the communication is authorized, communication manager 106B may then re-header the communication according to the appropriate IPv4 address associated with the virtual network, and forward the communication to the destination node.

As discussed above, communication managers 104B and 106B may perform additional steps to enhance network isolation and security. For example, the communications managers may verify that a source node is authorized to communicate with a destination node based on, for example, whether the source and destination nodes are associated with a common physical network, whether the source and destination nodes are associated with a common user, customer, or organizational entity, and whether the source and destination nodes are associated with different entities that are authorized to communicate with each other. The communication managers may also authorize receipt of an incoming communication based on whether the incoming communication is of an allowed type, as determined through a dynamic interaction with mapping service 112A. Further, in disclosed embodiments, the authorization functions of mapping service 112A and the communications managers may be leveraged to securely distribute cryptographic keys to nodes of the virtual network without explicit node-to-node communications.

Figure 2:
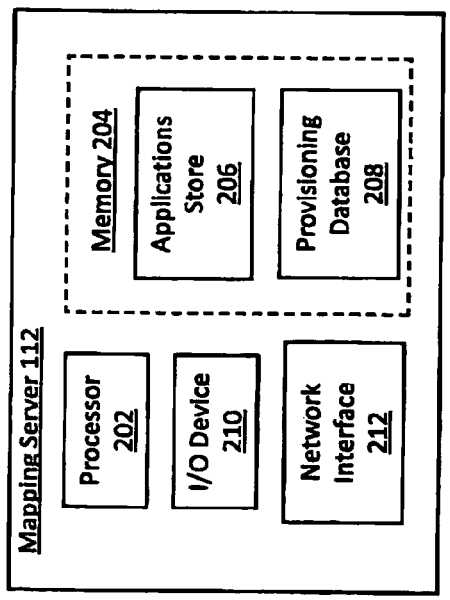
FIG. 2 is a diagram of an exemplary architecture of a mapping server.

FIG. 2 is a diagram of an exemplary architecture of mapping server 112, consistent with disclosed embodiments. In FIG. 2, mapping server 112 may include a processor 202, a memory 204, an input/output device 210, and a network interface 212 for communicating via one of more of interconnecting network 120 and network 130. Further, although not depicted in FIG. 2, mapping server 112 may host a mapping service 112A that, in an embodiment, may authorize and otherwise communications sent to and from the nodes of data center 102 of FIG. 1, as outlined above.

Processor 202 may include one or more processors (e.g., a CPU) configured to execute instructions and to process data to perform one or more functions associated with system 100. For example, processor 202 may be configured to execute instructions to perform one or more of the computer-implemented methods described below in reference to FIGS. 5-7.

Memory 204 may include one or more memory devices that store data, including, but not limited to, random access memory (RAM), read-only memory (ROM), a magnetic storage device (e.g., a hard disk), an optical storage device (e.g., a CD- or DVD-ROM), an electronic storage device (e.g., EPROM or a flash drive), and/or another other data storage devices known in the art. Memory 204 may store an operating system, such as DOS, Windows, or Linux, and one or more applications for performing the disclosed processes, which may be executed by processor 202. The applications may be implemented using applets, plug-ins, modules, and/or any other software components known in the art.

Mapping server 112 may also include an applications store 206 and a provisioning database 208. In an embodiment, applications store 206 includes application programs that facilitate the management and configuration of nodes within virtual networks, and that facilitate other functionalities related to the provisioning, initialization, and execution of programs on nodes within the virtual networks. For example, the application programs within applications store 206 may allow mapping service 112A to identify and select programs executable by virtual nodes of virtual networks, to select nodes of physical networks that execute one or more application programs, and to map a virtual network address of a virtual node to a physical network address of a node of the physical network. Further, as described below, the applications within applications store 206 may also facilitate the selection and distribution of cryptographic keys to the nodes of the physical network of data center 102.

Provisioning database 208 may include information associated with the physical and virtual resources (e.g., networking components and hardware) associated with executing programs and nodes of the physical network. For example, provisioning database 208 may include virtual network addresses, i.e., network addresses in accordance with the network addressing protocol of the virtual network, for each virtual node in the virtual networks. Further, for example, provisioning database 208 may also include physical network addresses of each of the nodes of the physical network, i.e., those network addresses expressed using a networking addressing protocol of a physical network, e.g., interconnecting network 120 of FIG. 1. Additionally, provisioning database 208 may include information mapping virtual network addresses of virtual nodes to physical network addresses of nodes.

Input/output (I/O) device 210 may include one or more components allowing a user of mapping server 112 to interface with applications executing on mapping server 112 and/or mapping service 112A (not shown). For example, input/output device 210 may include input devices such as a keyboard, a keypad, a mouse, a touch pad, a touch screen, a microphone, an accelerometer, and/or any other user input device known in the art. Input/output device 210 may also include an output device, including, but not limited to, a display (e.g., an LCD, a CRT display, or a plasma display), a printer, a speaker, and/or any other output device known in the art.

Network interface 212 may include any communication device for sending and receiving data. For example, network interface 212 may include a modem, a transceiver, a network communication card, a satellite dish, an antenna, or another network adapter capable of transmitting and receiving data over interconnecting network 120 and additionally or alternatively, network 130.

In an embodiment, applications store 206 and provisioning database 208 form a portion of memory 204. However, in additional embodiments, applications store 206 and provisioning database 208 may be included within one or more external memory devices in communication with mapping server 112 via interconnecting network 120 using, for example, network interface 212.

Figure 3:
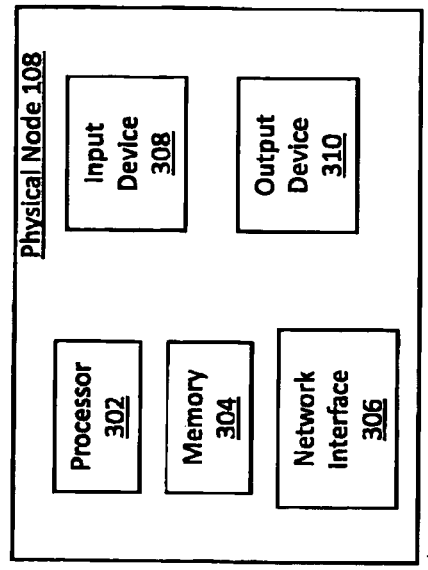
FIG. 3 is a diagram of an exemplary architecture of a physical node.

FIG. 3 is a diagram of an exemplary architecture of node 108, consistent with disclosed embodiments. Although the following discussion refers to node 108, node 110 also may include components equivalent to those discussed below in connection with FIG. 3. Furthermore, although FIG. 3 depicts node 108, communication manager 114 may be executed on a computer system having components configured similarly to node 108.

Node 108 may include a processor 302, a memory 304, a network interface 306, an input device 308, and an output device 310. Processor 302 may include one or more processors (e.g., a CPU) configured to execute instructions and to process data to perform one or more functions associated with system 100. For example, processor 302 may be configured to execute instructions to perform one or more of the computer-implemented methods described herein.

Memory 304 may include one or more memory devices that store data, including, but not limited to, random access memory (RAM), read-only memory (ROM), a magnetic storage device (e.g., a hard disk), an optical storage device (e.g., a CD- or DVD-ROM), an electronic storage device (e.g., EPROM or a flash drive), and/or another other data storage devices known in the art. Memory 304 may store an operating system, such as DOS, Windows, or Linux, and may also include one or more application programs, such as word processing, database programs, spreadsheet programs, presentation programs, and graphics programs, and/or other programs capable of generating documents or other electronic content. Further, in an embodiment, memory 304 may also include browser applications capable of rendering standard Internet content, such as Netscape Navigator, Microsoft Internet Explorer, and/or Mozilla Firefox.

In an embodiment, processor 304 may leverage and execute the operating system, the application programs, and/or the browser applications in connection with the disclosed processes. For example, the application programs may be implemented using applets, plug-ins, modules, and/or any other software components known in the art.

As discussed above in reference to mapping server 112, network interlace 306 may include any communication device for sending and receiving data across interconnecting network 120, and additionally or alternatively, network 130. For example, network interface 306 may include a modem, a transceiver, a network communication card, a satellite dish, an antenna, or another network adapter capable of transmitting and receiving data over interconnecting network 120 and/or network 130.

Input device 306 and output device 308 may include one or more components that allow a user of node 108 to interface with applications executing on node 108. For example, input device 308 may include devices such as a keyboard, a keypad, a mouse, a touch pad, a touch screen, a microphone, an accelerometer, and/or any other user input device apparent to one of ordinary skill in the art and consistent with node 108. Output device 310 may include, but is not limited to, a display (e.g., an LCD, a CRT display, or a plasma display), a printer, a speaker, and/or any other output device apparent to one or ordinary skill in the art and consistent with node 108.

Figure 4:
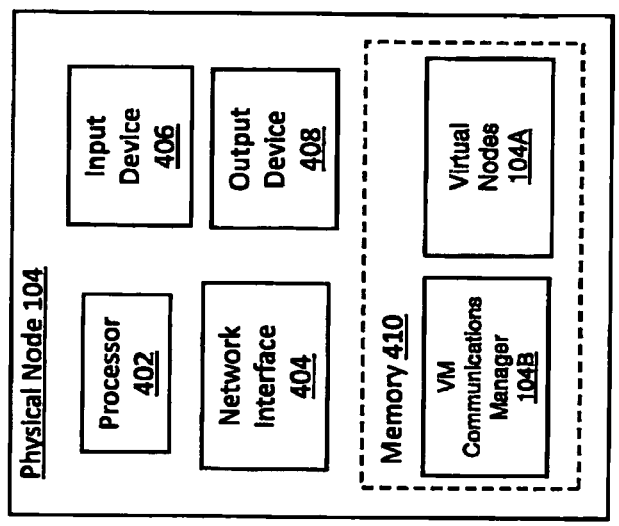
FIG. 4 is a diagram of an exemplary architecture of a physical node hosting virtual nodes.

FIG. 4 is a diagram of an exemplary architecture of node 104 hosting a virtual network, consistent with disclosed embodiments. Furthermore, although FIG. 4 depicts node 104, node 106 may have components configured similarly to node 104.

Node 104 may include a processor 402, a network interface 404, an input device 406, an output device 408, and a memory 410. Processor 402 may include one or more processors (e.g., a CPU) configured to execute instructions and to process data to perform one or more functions associated with system 100. For example, processor 402 may be configured to execute instructions to perform one or more of the computer-implemented methods described herein.

As discussed above in reference to mapping server 112, network interface 404 may include any communication device for sending and receiving data across interconnecting network 120, and additionally or alternatively, network 130. For example, network interface 404 may include a modem, a transceiver, a network communication card, a satellite dish, an antenna, or another network adapter capable of transmitting and receiving data over interconnecting network 120 and/or network 130.

Input device 406 and output device 408 may include one or more components that allow a user of computer system 104 to interface with applications executing on computing system 104, and additionally or alternatively, with one or more of virtual nodes 104A. For example, input device 406 may include devices such as a keyboard, a keypad, a mouse, a touch pad, a touch screen, a microphone, an accelerometer, and/or any other user input device apparent to one of ordinary skill in the art and consistent with computing system 104. Output device 408 may include, but is not limited to, a display (e.g., an LCD, a CRT display, or a plasma display), a printer, a speaker, and/or any other output device apparent to one or ordinary skill in the art and consistent with computing. system 104.

Memory 410 may include one or more memory devices that store data, including, but not limited to, random access memory (RAM), read-only memory (ROM), a magnetic storage device (e.g., a hard disk), an optical storage device (e.g., a CD- or DVD-ROM), an electronic storage device (e.g., EPROM or a flash drive), and/or another other data storage devices known in the art. Memory 410 may store an operating system, such as DOS, Windows, or Linux, and may also include one or more application programs, such as word processing, database programs, spreadsheet programs, presentation programs, and graphics programs, and/or other programs capable of generating documents or other electronic content. Further, in an embodiment, memory 410 may also include browser applications capable of rendering standard Internet content, such as Netscape Navigator, Microsoft Internet Explorer, and/or Mozilla Firefox.

In an embodiment, processor 410 may leverage and execute the operating system, the application programs, and/or the browser applications in connection with the disclosed processes. For example, the application programs may be implemented using applets, plug-ins, modules, and/or any other software components known in the art.

Node 104 may host a virtual network that includes one or more virtual nodes 104A, and may include a VM communications manager module 104B configured to manage communications associated with virtual nodes 104A. In an embodiment, and as described above, VM communication manager 104B may maintain mapping information associated with virtual nodes 104A and node 104, and additionally or alternatively, with other virtual nodes within the virtual network.

In an embodiment, the stored mapping information may be obtained through a dynamic interaction with mapping service 112A. For example, such mapping formation may include a virtual network address associated with the nodes of the virtual network, a physical network address of the virtual nodes of the virtual network, and information identifying one or more virtual networks associated with each of virtual nodes 104A. Further, for example, the mapping information may also include information mapping virtual network addresses of virtual nodes 104A to a physical network address of node 104. As described above, VM communications manager 104B may authorize communications transmitted from virtual nodes 104A, or directed to virtual nodes 104A, using the stored mapping information obtained by dynamic interaction with mapping service 112A.

In an embodiment, virtual nodes 104A and VM communications manager 104B are executed by processor 402, and images of virtual nodes 104A and VM communications 104B are stored within a portion of memory 410. However, in an additional embodiment, one or more of virtual nodes 104A and VM communications manager 104B may be executed within an additional computer-readable storage device housed by computing system 104, and additionally or alternatively, on an external storage device in communications with computing system 104 via, for example, interconnecting network 120 of FIG. 1.

As discussed above, communications associated with nodes 108 and 110 can be managed, configured, and authorized by communications manager 114. In an embodiment, communications manager 114 may function similarly to communications manager 104B described above. For example, communications manager 114 may be configured to manage communications associated with nodes 108 and 110, and to obtain maintain mapping information associated with nodes 108 and 110 through dynamic interaction with mapping service 112A.

As described above, mapping service 112A, in conjunction with communication managers 104B, 106B, and 114, may authorize communications across nodes of a physical network to enhance network isolation and security. For example, a communication manager 104B may authorize an outgoing communication from one of virtual nodes 104A based on information regarding the source and/or destination virtual node, including, but not limited to, a virtual network address of the source and/or destination node, a physical network address of the source and/or destination node, and information about virtual networks and/or entities associated with the source and/or destination virtual nodes. In such embodiments, the information regarding the source and/or destination virtual node may be obtained from a dynamic interaction with mapping service 112A.

Communications within the physical network, e.g., between virtual nodes 104A and 106A, and nodes 104, 106, 108, and 110, may proceed according to one or more communications protocols, including, but not limited to, hypertext transfer protocol (HTTP) and transmission control protocol/internet protocol (TCP/IP), transport layer security (TLS) protocols, or secure sockets layer (SSL) protocols. For example, a source node of the virtual network may transmit data packets to a destination node using an encrypted and authenticated TCP/IP protocol, e.g., IPSec, that includes, but is not limited to, a key exchange that establishes a security association between the source and destination nodes, and an authentication header that maintains data integrity and data origin authentication of transmitted packets.

In such embodiments, the integrity and authenticity of transmitted data packets may be verified through the use of a hashed message authentication code (HMAC) based on a cryptographic key and an underlying hash function computed using the cryptographic key. A cryptographic strength of such a HMAC may depend on, for example, a cryptographic strength of the underlying hash function, on the size and quality of the key, and the size of the hash output length in bits. For example, conventional HMAC techniques may employ underlying hash functions that generate 128-bit hash values and 160-bit hash values, although any number of additional underlying hash functional may be utilized, as would be apparent to one of skill in the art.

Furthermore, the confidentiality of transmitted data packets may be ensured through an application of an encryption algorithm to the transmitted data packets. For example, a source node may encrypt an outgoing data packet using any of a number of encryption algorithms including, but not limited to, public-key techniques (e.g., Diffie-Hellman algorithms and RSA techniques) and symmetric-key algorithms. For example, such encryption techniques may leverage the cryptographic keys distributed by mapping service 112A to encrypt the transmitted data packages.

In an embodiment, the functionality of mapping server 112, and mapping service 112A, can be leveraged to securely distribute cryptographic keys to enable nodes of a physical network to authenticate communications transmitted across the physical network. In such embodiments, a source and destination node of the physical network may authenticate transmitted messages without exchanging multiple node-to-node communications that collectively calculate and negotiate a shared secret key, e.g., through a Diffie-Hellman key exchange common with the Internet Key Exchange (IKE) protocol of IPSec.

Figure 5:
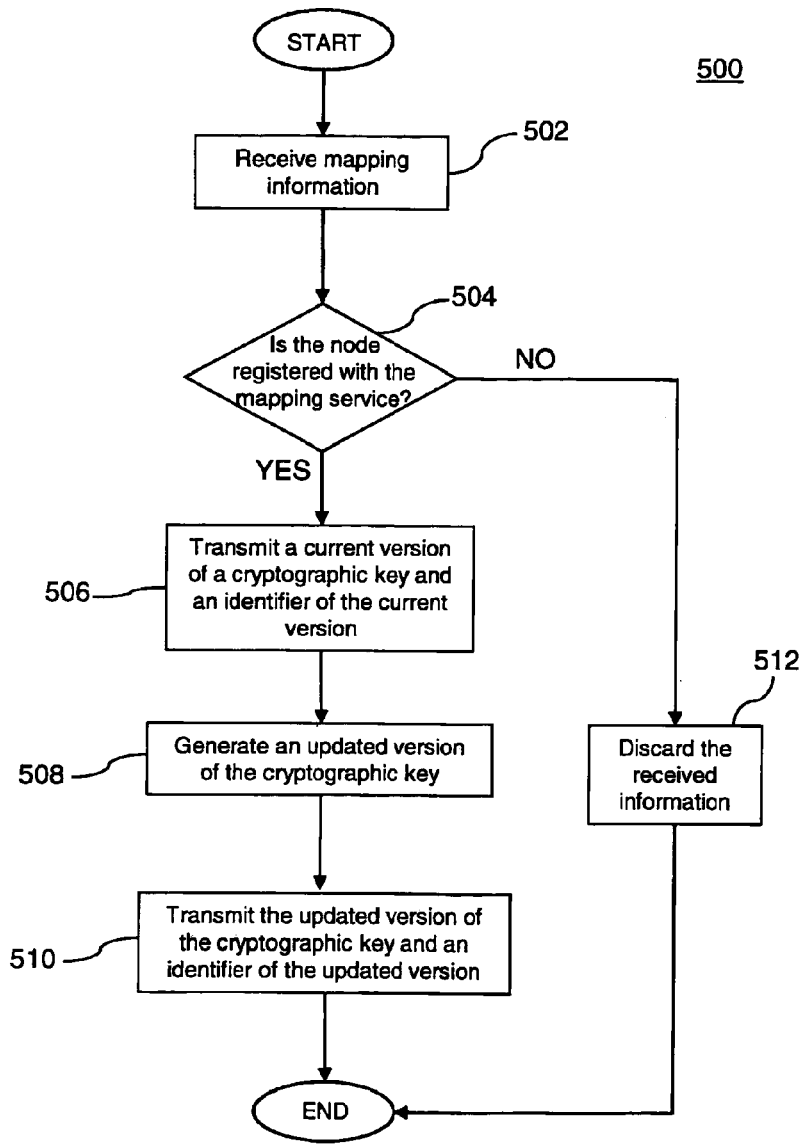
FIG. 5 is a flow diagram of an exemplary routine for distributing cryptographic keys in a virtual network.

FIG. 5 is a flow diagram of an exemplary routine 500 through which a mapping service securely distributes cryptographic keys to nodes of a physical network, consistent with a disclosed embodiment. Routine 500 provides further details describing how system 100 provides functionality for securely distributing cryptographic keys within a physical network.

In block 502, a mapping service, e.g., mapping service 112A, receives mapping information. For example, mapping service 502 may receive the mapping information in block 502 from a node of the physical network, e.g., nodes 104, 106, 108, and 110. In an embodiment, the received mapping information may map a virtual network address of a virtual node, e.g., virtual nodes 104A and 106A, to a physical network address of a node hosting the virtual nodes, e.g., nodes 104 and 106. For example, the virtual node may be incorporated into one or more virtual networks hosted by the node. For example, as discussed above, the mapping information may be transmitted from the node to mapping service 112A through a corresponding communications manager, e.g., one of communications managers 104B, 106B, and 114, via interconnection network 120.

Further, in an embodiment, the received mapping information may include, but is not limited to, a virtual network address of the virtual node, a physical network address of the node, or additional information identifying one or more virtual and physical networks associated with the node. For example, the virtual network address of the node may be defined according to a network addressing protocol associated with the virtual network, and the physical network address associated with the node may be defined according to a network addressing protocol associated with a physical network on which the virtual network is overlaid, e.g., interconnection network 120. However, in other disclosed embodiments, the mapping information received by the mapping service may include any additional or alternate mapping information apparent to one of skill in the art and appropriate to the node and mapping service.

In block 504, mapping service 112A may verify that the node is registered based on the received mapping data. In an embodiment, mapping service 112A may compare the received mapping information with stored information associated with the physical network, e.g., information within provisioning database 208 of mapping server 112. For example, the stored information may include, but is not limited to, virtual network addresses of the virtual nodes hosted within the physical network, physical network addresses of the nodes of the physical network, and any additional or alternate information associated with the nodes of the physical network.

If it is determined in block 504 that the node is registered, mapping service 112A may transmit a current version of a cryptographic key to the node in block 506. In an embodiment, in block 506, mapping service 112A may also transmit an identifier of the current version of the cryptographic key, for example, an current version number, a date associated with the cryptographic key, and additionally or alternatively, a time stamp associated with the cryptographic key. Once the node receives the cryptographic key transmitted in block 506, the node may proceed to authenticate incoming and outgoing messages using the current version of the cryptographic key, as described below in reference to FIGS. 6 and 7.

Further, although not depicted in FIG. 5, mapping service 112A may transmit additional information to the node in block 506. In an embodiment, the additional information may include data related to the current version of the cryptographic key including, but not limited to, information that identifies a period of validity of the transmitted cryptographic key. Further, the additional information may include information associated with the physical network or the hosted virtual networks and information associated with software updates. In an embodiment, the additional information transmitted to the requested node in block 506 may be filtered according to access data associated with the node, e.g., an access list or an access table.

In block 506, mapping service 112A may select the current version of the cryptographic key may represent one or more pre-determined keys, or alternatively, mapping service 112A may generate the current version of the cryptographic key. For example, the current version of the cryptographic key may be specific to a virtual network hosted by the node, the physical network including the node, a subset of nodes of the physical network, or a virtual node of the virtual networks. Further, for example, the current version of the cryptographic key can be selected or generated on the basis of source and/or destination virtual nodes of the virtual network that have exchanged data packets with the node, a virtual network host by the node, and additionally or alternatively, selected or generated using any algorithm or technique apparent to one of skill in the art.

In an embodiment, mapping service 112A may regularly rotate and invalidate the cryptographic keys in order to enhance the security of the authentication processes. For example, the cryptographic key may be rotated on a periodic basis, e.g., an updated version of the key may be selected or identified each day, each hour, or at any additional or alternate time period apparent to one of skill in the art. Further, the selection or generation of an updated version of the cryptographic key may be based on traffic across the physical network, for example, after a specified number of messages have been transmitted across the physical network, between subsets of nodes of the physical network, or according to any additional or alternate technique apparent to one of skill in the art.

In block 508, mapping service 112A may generate an updated version of the cryptographic key, and may transmit the updated version of the cryptographic key to the node in block 510. Further, in block 510, mapping service 112A may additionally transmit an identifier of the updated version of the cryptographic key to the node. For example, and as described above, the identifier of the updated version of the cryptographic key may include, but is not limited to, a version number, a date associated with the cryptographic key, a time stamp associated with the cryptographic key, or any additional or alternate identifying information apparent to one of skill in the art.

In an embodiment, the updated version of the cryptographic key and the identifier may be transmitted to the node in step 510 at periodic intervals, e.g., every second, minute, or hour. However, in additional embodiments, the mapping service 112A may transmit the updated version of the cryptographic key to the node at any additional or alternate non-periodic interval apparent to one of skill in the art, for example, at non-periodic intervals based on, for example, traffic across the physical network.

Further, in an embodiment, the mapping service 112A may receive a request from the node for the updated version of the cryptographic key, and may transmit the updated version of the cryptographic key to the node in step 508 in response to the received request. For example, a program executing at the node may generate and transmit the request to mapping server 112A periodically, non-periodically, on the basis of messages serviced by the node, or any combination thereof. In an embodiment, the node transmits the request to mapping service 112A through a communications manager associated with the node, e.g., one of communications managers 104B, 106B, and 114, via interconnection network 120.

The received request for the updated cryptographic key may include information identifying the requesting node, including, but not limited to, a physical network address of the node. Although not depicted in FIG. 5, mapping service 112A may compare the received information against the stored information associated with the virtual network to determine whether the requesting node is currently registered with mapping service 112A and entitled to receive cryptographic keys.

If mapping service 112A determines that the requesting node is currently registered, then mapping service 112A may transmit the updated version of the cryptographic key to the requesting node in block 510, and may include information identifying the updated version. Once the requesting node receives the updated version of the cryptographic key, the requesting node may authenticate incoming and outgoing messages using the updated version of the cryptographic key, as described below in reference to FIGS. 6 and 7. However, if mapping server 112A determines that the requesting node is no longer registered with mapping service 112A, the request for the updated cryptographic key may be discarded. In an embodiment, mapping service 112A may subsequently transmit an error message to the requesting node according to the information identifying the requesting node.

Further, although not depicted in FIG. 5, mapping service 112A may transmit additional information to the node in block 506 and additionally or alternatively, in step 510. In an embodiment, the additional information may include data related to the cryptographic key including, but not limited to, information that identifies a period of validity of the transmitted cryptographic key. Further, the additional information may include information associated with the virtual network and information associated with software updates. In an embodiment, the additional information transmitted to the requested node in block 506 and 510 may be filtered according to an access data associated with the node, e.g., an access list or an access table.

Further, and referring back to block 504, if it is determined that the received mapping data does not match the stored mapping data, then the node is not registered with mapping service 112A. Mapping service 112A may then discard the received mapping data in block 512. In an embodiment, mapping service 112A may also transmit an error message to the network address associated with the mapping data to indicate that the node is not included within the physical network.

Figure 6:
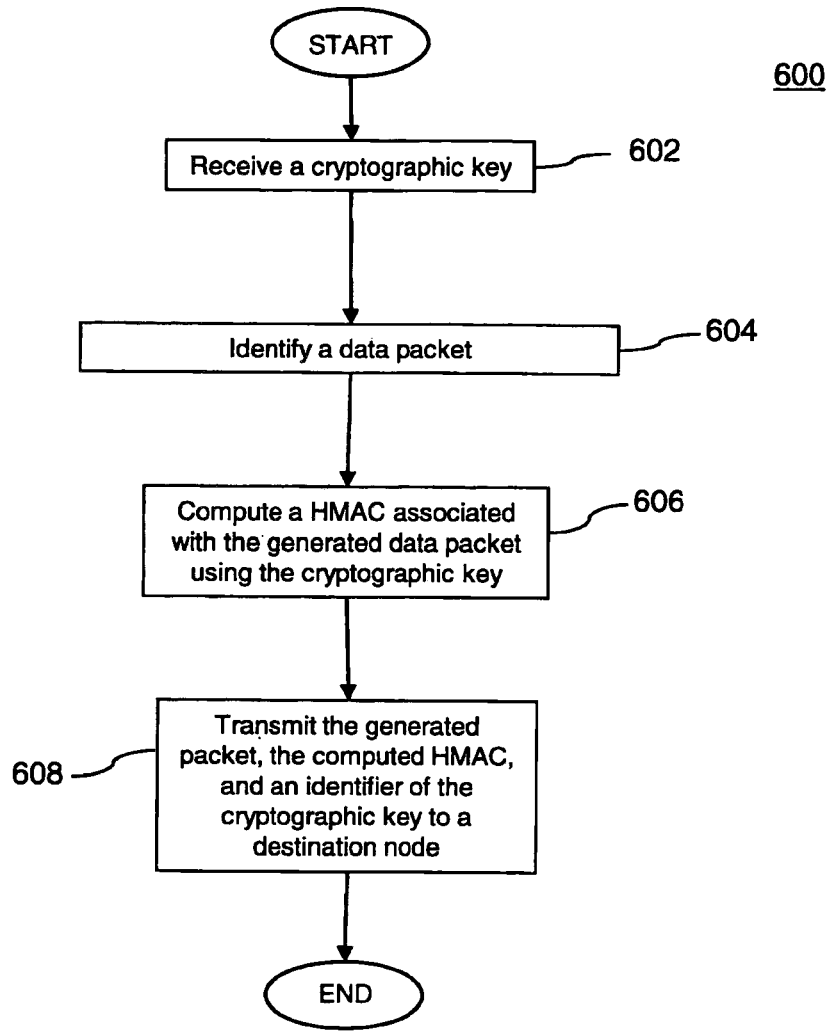
FIGS. 6 and 7 are flow diagrams of exemplary routines for authenticating messages communicated within a virtual network.

As described above, a node may receive versions of a cryptographic key and can authenticate incoming and outgoing messages using the received versions of the cryptographic key. FIG. 6 is a flow diagram of an exemplary routine 600 for authenticating an outgoing message using a received cryptographic key, consistent with disclosed embodiments. Routine 600 provides further details describing how nodes of network 100 provide functionality for authenticating communications transmitted across a physical network.

In block 602, a node of a physical network, e.g., nodes 104, 106, 108, and 110, may receive a cryptographic key from a mapping service, such as mapping service 112A. Further, in block 602, the node may also receive an identifier of a version of the received cryptographic key, and additional information associated with the cryptographic key, including, but not limited to, a period of validity of the cryptographic key. In an embodiment, the cryptographic key received in block 602 may represent a current version of the cryptographic key, as transmitted by mapping service 112A in block 506 of FIG. 5, or alternatively, the cryptographic key may represent any of a number of updated versions of the cryptographic key transmitted by mapping service 112A in block 510 of FIG. 5.

The node may then identify a data packet for transmission across the physical network in block 604. In an embodiment, the data packet may include a header and a payload, and the generated data packet may be prepared for transmission across the physical network to a destination node according to one or more of the communications protocols described above. Further, in an embodiment, the identified data packet may be generated by the node for transmission across the physical network to the destination node, or alternatively, may be generated by a virtual node hosted by the node, as described above. For example, the destination node may represent a node within the physical network, e.g., one of nodes 108 and 110, or alternatively, the destination node may represent a virtual node of a virtual network hosted by a node, e.g., virtual nodes 104A and 106A.

In block 606, the node computes a hashed message authentication code (HMAC) for the identified packet based on the received cryptographic key and an underlying hash function associated with the cryptographic key. For example, the node may compute the HMAC for the generated packet using a hash function selected from the SHA family of functions, e.g., SHA-2, or by using additional or alternate techniques, such as randomized hashing.

In an embodiment, the HMAC may be computed over only a header of the generated data packet. For example, the node may compute the HMAC in block 606 by applying the underlying hash function to the header of the generated data packet. In such an embodiment, the computed HMAC provides an assurance that the registered node is authorized to transmit the data packet within the virtual network, while reducing a computational cost associated with the computation of the HMAC for each packet.

In an additional embodiment, the HMAC may be computed over both the header and the payload of the generated data packet. For example, the node may compute the hash value in block 606 by applying the underlying hash function to both the header and the payload of the generated data packet. In such an embodiment, the computed HMAC may provide an additional assurance that the payload of the generated data packet is authentic and has not been subject to tampering during transmission to the destination node.

Once the HMAC is computed in block 606, the node may transmit the generated data packet and the computed HMAC to the destination node in block 608. In an embodiment, the node may transmit the generated data packet and computed HMAC to the destination node, e.g., nodes 104, 106, 108, and 110, according to one or more of the communications protocols discussed above.

The calculation of the HMAC for the generated data packet in step 606, while ensuring the integrity of packets received by the destination not, does not guarantee the confidentiality of the data included within the generated packet. In an additional embodiment, not depicted in FIG. 6, the generated data packet may be encrypted to ensure the confidentiality of the customer data included within the data packet. For example, the generated data packet may be encrypted according to a public-key technique, e.g., a Diffie-Hellman algorithm or a RSA algorithm, a symmetric-key technique, or any additional or alternate technique apparent to one of skill in the art. In such an embodiment, the node may transmit the encrypted data packet and the computed HMAC to the destination node in block 608.

Figure 7:
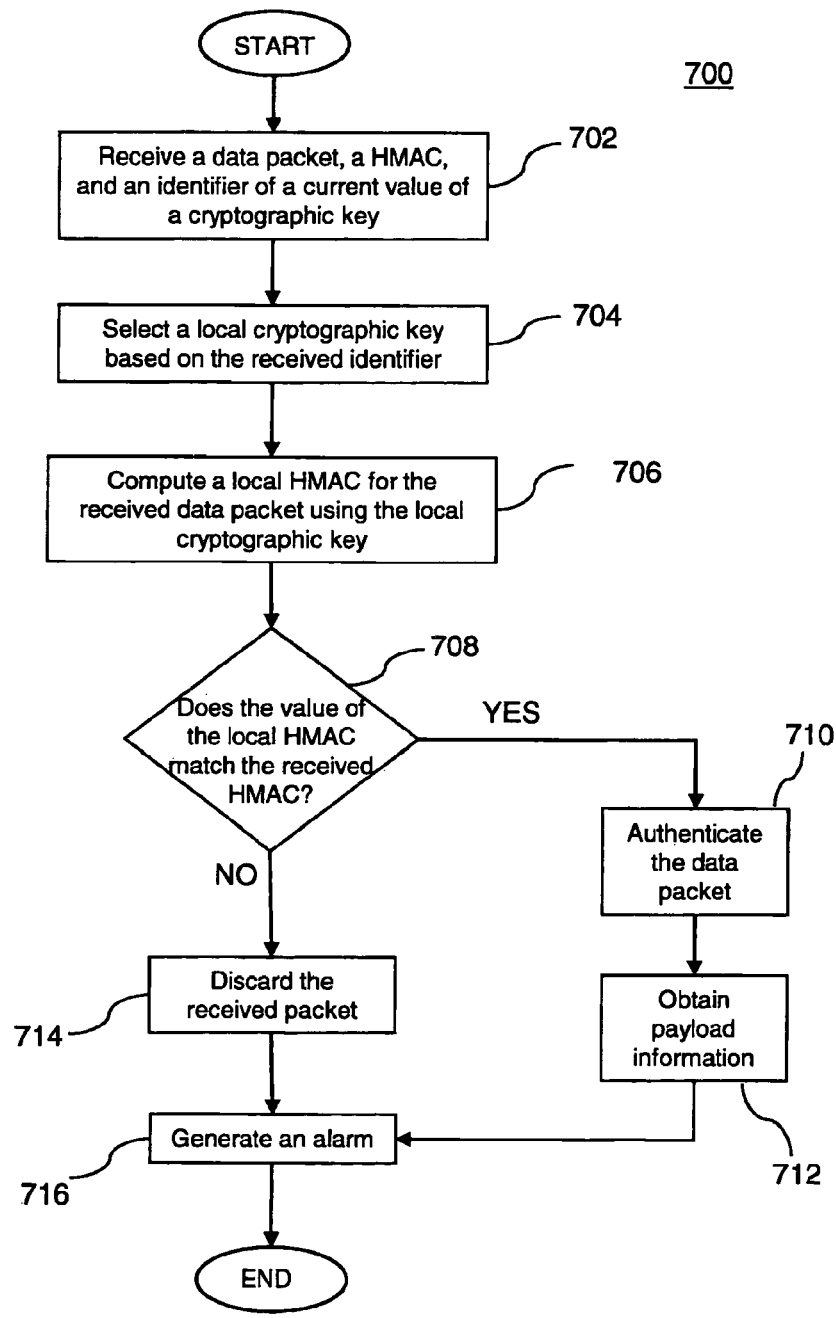

FIG. 7 is a flow diagram of an exemplary routine 700 for authenticating an incoming message using a received cryptographic key, consistent with disclosed embodiments. Routine 700 provides further details describing how nodes of network 100 provide functionality for authenticating communications transmitted across a physical network.

In block 702, a node within the physical network may receive a communication from a source node. In an embodiment, the received communication may include a data packet generated at the source node, e.g., generated in block 604 of FIG. 6, a computed hashed message authentication code (HMAC) value corresponding to the generated data packet, e.g., the HMAC computed in block 606 of FIG. 6, and an identifier of a current version of the cryptographic key.

For example, the identifier may include a version number of the current version of the cryptographic key. In additional embodiments, the received communication may include an identifier of a date associated with the current version of the cryptographic key, an identifier of a time stamp associated with the current version of the cryptographic key, an identifier of a period of validity of the current version of the cryptographic key, or any additional or alternate identifier apparent to one of skill in the art. For example, the identifiers included within the received communication may be incorporated into a text file appended to the generated data packet.

In block 704, the node may select a local version of the cryptographic key based on the identifier of the current version of the cryptographic key included within the received communication. In an embodiment, the node may store one or more prior versions of the cryptographic key, and the node in block 704 may select the local version based on the one or more received identifiers of the current version of the cryptographic key.

For example, a version number of the local cryptographic key selected in step 704 may match a version number included within the received identifier. However, in additional embodiments, the version number of the local cryptographic key selected in step 704 may fall within a specified number of versions of the current version of the cryptographic key, and additionally or alternatively, a date or time associated with the local version of the cryptographic key may fall within a specified period of a date or time associated with the current version of the cryptographic key.

Once a local version of the cryptographic key is selected, block 706 may compute a local version of a HMAC corresponding to the received data packet. As described above, the local HMAC may be computed based on underlying hash function and the local version of the cryptographic key selected in block 704.

For example, the hash function associated with the cryptographic key may be selected from the SHA family of functions, e.g., SHA-2, or may employ randomized hashing not characterized by collision resistance. Further, as described above, the computed local HMAC may be based the header of the received generated data packet, or alternatively, the computed local HMAC may be based on both the header and the payload of the received data packet.

The node may then determine in block 708 whether a value of the local HMAC matches a value of the received HMAC, as computed by the source node, e.g., in block 606 of FIG. 6. If it is determined that the value of the local HMAC matches the value of the received HMAC, then the node authenticates the received data packet in block 710 and obtains data within the payload of the received message in block 712.

However, if it is determined in block 708 that the value of the local HMAC does not match the value of the received HMAC, then the node cannot directly authenticate the received data packet, and the node discards the received data packet in block 714. The node may also generate an alarm in block 716 when the received data packet cannot be directly authenticated in block 714. In an embodiment, the generated alarm may be logged and stored locally at the node, e.g., within memory 304 of physical node 108, and additionally or alternatively, the generated alarm may be transmitted over network 120 to mapping service 112A of mapping server 112, to any other module executed by mapping server 112, or to a secured destination available via network 120 or network 130.

In such an embodiment, an intermediate party may have tampered with the data packet during the transmission of the data packet from the source node. However, in an additional embodiment, tampering may not have occurred, and the source node may have computed the HMAC of the data packet using an obsolete version of the cryptographic key. For example, the source node may have computed the HMAC of the data packet prior to obtaining an updated version of the cryptographic key from the mapping service.

Further, and as described above, the data packet received in block 702 may be encrypted by the source node to ensure the confidentiality of the data included within the packet. In such an embodiment, the node may decrypt the received data packet to generate a decrypted data packet, and may compute the local HMAC value in block 706 using the decrypted data packet. For example, the node may decrypt the received data packet using any one of a number of appropriate techniques, as described above. Further, in such embodiments, the node may decrypt the received data packet using the local cryptographic key selected in block 705, or using any additional or alternate key available and apparent to one of skill in the art.

In the embodiments described above, traffic between nodes of the physical network may be susceptible to "replay attacks," in which a party records packets transmitted across the network and replays the recorded packets at a later date. For example, the party may monitor network traffic and observe that a node shuts down upon receipt of a series of packets. Under such circumstances, the party may record these packets and replay these packets to ill effect.

In an embodiment, the communications protocols used to transmit data packets across the physical network may reduce the effectiveness of such "replay attacks." For example, such protocols may include, but are not limited to, "RFC 4301: Security Architecture for the Internet Protocol," "RFC 4302: IP Authentication Header," "RFC 4303: IP Encapsulating Security Payload," "RFC 4304: Extended Sequence Number (ESN) Addendum to IPsec Domain of Interpretation (DOI) for Internet Security Association and Key Management Protocol (ISAKMP)," "RFC 4305: Cryptographic Algorithm Implementation Requirements for Encapsulating Security Payload (ESP) and Authentication Header (AH)," "RFC 4306: Internet Key Exchange (IKEv2) Protocol," "RFC 4307: Cryptographic Algorithms for Use in the Internet Key Exchange Version 2 (IKEv2)," "RFC 4308: Cryptographic Suites for IPsec," and "RFC 4309: Using Advanced Encryption Standard (AES) CCM Mode with IPsec Encapsulating Security Payload (ESP)," the disclosures of which are incorporated herein by reference in their entirety.

As one of ordinary skill in the art will appreciate, one or more of blocks 502-512, 602-608, and 702-716 may be optional and may be omitted from implementations in certain embodiments. Furthermore, functionality provided by one or more of blocks 502-512, 602-608, and 702-716 may be subdivided into multiple blocks.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting additional blocks or deleting blocks. It is intended, therefore, that the specification and examples be considered as exemplary only, with a true scope and spirit being indicated by the following claims and their full scope of equivalents.

What is claimed is:

1. A computer-implemented method comprising:
    receiving, by a host computing system configured to host one or more virtual computing nodes of a virtual network and from a mapping server for the virtual network that maintains mapping information associating virtual network addresses of the virtual network with physical network addresses, a cryptographic key;
    receiving, by the configured host computing system, a communication from a first of the virtual computing nodes that is intended for a destination virtual computing node in the virtual network other than the first virtual computing node;
    generating, by the configured host computing system based at least in part on the communication and on the cryptographic key received from the mapping server, a hash value for the communication; and
    forwarding, by the configured host computing system and based at least in part on the mapping information maintained by the mapping server, the communication and the generated hash value to the destination virtual computing node.

2. The computer-implemented method of claim 1 further comprising, under control of a second host computing system hosting the destination virtual computing node:
    receiving information from the configured host computing system that includes the forwarded communication and the forwarded hash value;
    based at least in part on the received information, selecting a local cryptographic key;
    generating a local hash value based at least in part on the selected local cryptographic key and on the forwarded communication; and
    authenticating the forwarded communication if the forwarded hash value matches the generated local hash value, and otherwise not authenticating the forwarded communication.

3. The computer-implemented method of claim 2 wherein the selection of the local cryptographic key is based at least in part on an identifier of a current version of the local cryptographic key.

4. The computer-implemented method of claim 1 wherein the virtual network is a first of multiple distinct virtual networks associated with the mapping server, and wherein the received cryptographic key is specific to the first virtual network.

5. The computer-implemented method of claim 1, further comprising receiving from the mapping server an identifier of a version of the received cryptographic key, and forwarding the received identifier to the destination node with the communication and the generated hash value.

6. The computer-implemented method of claim 1, further comprising:
    at a first time that is after the forwarding of the communication, receiving an updated version of the cryptographic key from the mapping server; and
    after the first time, receiving an additional communication from a computing node of the virtual network, and using the updated version of the cryptographic key to generate an additional hash value for the additional communication before forwarding the additional communication and the additional hash value to a destination node indicated by the additional communication.

7. The computer-implemented method of claim 1 further comprising, prior to the forwarding of the communication, encrypting at least a portion of the received communication using the received cryptographic key.

8. The computer-implemented method of claim 7 wherein the communication includes a data packet having a header and a payload, and wherein encrypting at least a portion of the received communication includes encrypting the payload of the data packet of the communication.

9. The computer-implemented method of claim 7 wherein encrypting at least a portion of the received communication includes encrypting at least one of a network address associated with the first virtual computing node and a network address associated with the destination virtual computing node.

10. A non-transitory computer-readable medium having stored contents that configure a computing device to perform a method, the method comprising:
    receiving, by a host computing system configured to host one or more virtual computing nodes of a first virtual network, a communication indicating a first of the virtual computing nodes hosted by the configured host computing system as a destination and further indicating a remote computing node of the first virtual network as a source, wherein receiving the communication includes receiving a hash value associated with the received communication;
    selecting, by the configured host computing system and based at least in part on the indicated source remote computing node and on information received from a mapping server for the first virtual network, one of multiple local cryptographic keys;

generating, by the configured host computing system and based at least in part on the selected local cryptographic key, a local hash value for the received communication; and authenticating, by the configured host computing system, the communication only if the generated local hash value matches the received hash value associated with the communication.

11. The non-transitory computer-readable medium of claim 10 wherein the stored contents further configure the computing device to, prior to receiving the communication, receive an identifier of a version of a cryptographic key from the mapping server for the virtual network, and wherein selecting the one local cryptographic key includes selecting the one local cryptographic key based on the received identifier.

12. The non-transitory computer-readable medium of claim 11 wherein the identifier includes at least one of a date associated with the version of the cryptographic key and a version number associated with the version of the cryptographic key.

13. The non-transitory computer-readable medium of claim 10 wherein receiving the communication further includes receiving an identifier of a version of a cryptographic key, and wherein selecting the one local cryptographic key includes selecting the one local cryptographic key based on the received identifier.

14. The non-transitory computer-readable medium of claim 10 wherein each of at least some of the multiple local cryptographic keys is associated with a virtual network, and wherein the selecting of the one local cryptographic key is based at least in part on the indicated source remote computing node being associated with the first virtual network.

15. The non-transitory computer-readable medium of claim 10 wherein the first virtual network is one of multiple distinct virtual networks associated with the mapping server, and wherein the selected local cryptographic key is specific to the first virtual network.

16. The non-transitory computer-readable medium of claim 10 further comprising, under control of a second host computing system hosting the indicated source virtual computing node:

receiving a first cryptographic key from the mapping server;

receiving a source communication from the source virtual computing node;

generating, based at least in part on the first cryptographic key and on the received source communication, a source hash value for the source communication; and forwarding the source communication and source hash value to the destination first virtual computing node.

17. A system, comprising:

one or more processors of a mapping server; and one or more memories of the mapping server including instructions that, upon execution by at least one of the one or more processors, cause the mapping server to manage one or more virtual networks and to:

receive information associating a physical network address with a virtual network address for a node of a first of the one or more virtual networks;

based at least in part on the received information, update mapping information maintained by the mapping server for the first virtual network;

provide, to one or more physical host machines that each hosts one or more nodes of the first virtual network, at least some of the updated mapping information; and transmit, to the one or more physical host machines, a cryptographic key associated with the first virtual network for use in authentication of communications within the first virtual network.

18. The system of claim 17 wherein transmitting the cryptographic key associated with the first virtual network to the physical host machine includes transmitting an identifier of a version of the cryptographic key.

19. The system of claim 17, further comprising multiple of the physical host machines, wherein in operation a first of the physical host machines hosts a first computing node of the first virtual network and:

receives the transmitted cryptographic key from the mapping server;

receives a communication from the first computing node that is intended for a destination other computing node of the first virtual network;

generates, based at least in part on the received communication and on the transmitted cryptographic key, a hash value for the communication; and forwards, based at least in part on the mapping information from the mapping server, the communication and the generated hash value to the destination other computing node.

20. The system of claim 19, wherein in operation a second of the physical host machines hosts a second computing node of the first virtual network and:

receives the transmitted cryptographic key from the mapping server;

receives the forwarded communication and the forwarded hash value from the first physical host machine;

selects, based at least in part on the forwarded communication and on the first computing node, the transmitted cryptographic key from the mapping server for use in authenticating the forwarded communication;

generates, based at least in part on the selected cryptographic key, a local hash value for the forwarded communication; and authenticates the forwarded communication only if the generated local hash value matches the forwarded hash value from the first physical host machine.

* * * * *